United States Patent [19]
Walker

[11] 3,833,123
[45] Sept. 3, 1974

[54] FILTERS

[76] Inventor: Alan John Walker, 387 Maidstone Rd., Wigmore, Gillingham, Kent, England

[22] Filed: Feb. 16, 1973

[21] Appl. No.: 333,015

Related U.S. Application Data
[63] Continuation of Ser. No. 116,586, Feb. 18, 1971, abandoned.

[30] Foreign Application Priority Data
Feb. 18, 1970 Great Britain...................... 7754/70

[52] U.S. Cl.................. 210/241, 210/388, 210/391, 210/413, 210/499
[51] Int. Cl............................................ B01d 33/22
[58] Field of Search........... 210/244, 388, 389, 391, 210/393, 413, 473, 499; 209/273, 413

[56] References Cited
UNITED STATES PATENTS
1,431,987   10/1922   Simpson.......................... 209/413 X
1,474,893   11/1923   Crocker........................... 209/273 X
2,138,810   11/1938   Wood................................. 209/273
2,799,398   7/1957    Hermann........................... 210/388
3,357,567   12/1967   Wake............................ 210/413 X
3,473,576   10/1969   Amneus......................... 210/499 X
3,477,571   11/1969   Maag............................. 209/273 X
3,483,974   12/1969   Pearsall............................ 209/273

Primary Examiner—John Adee
Attorney, Agent, or Firm—Watson, Cole, Grindle & Watson

[57] ABSTRACT

An inclined screen filter comprising a perforate and substantially flat screen having means to supply a flow of fluid material to be filtered to the outwardly sloping face of the screen whence it falls for collection, in which means are provided to reduce the adherence of the filtrate held thereon by surface tension forces so that it falls free of the screen.

19 Claims, 5 Drawing Figures

FILTERS

This is a continuation, of application Ser. No. 116,586 filed Feb. 18, 1971 and now abandoned.

This invention relates to improvements in Inclined Screen Filters or Savealls of the type used, for example, in the paper industry to remove wood and other fibers from the aqueous effluent emanating from the paper making machinery. Such Savealls consist of a fixed planar rectangular wire mesh screen inclined downwards at about 50° to the horizontal and above which is a header tank from which fiber-bearing liquid flows onto the screen in the vicinity of the highest edge of the screen and generally in the plane of the screen. The stream of liquid flows down the screen, and in so doing liquid passes through the screen under the action of gravity, falling into a trough-like receptacle situated beneath the screen, leaving behind the fibers which are too big to pass through the mesh of the screen. A region of screen is reached where all the free liquid has passed through leaving behind a layer of wet fibers which continues to slide downwards, draining further as it does until it falls off the lower end of the screen and into a suitable receptacle.

Inclined Screen Savealls in the form above described have fallen into disuse because they were generally inefficient due to the coarse mesh screens that were used which allowed a high proportion of fibers to pass through. It is believed that the use of screens having a fine mesh, say 120 meshes to the inch for example, was impractical because the surface tension of the liquid undergoing filtration, caused it to adhere to and flow downwards along the underside of the screen instead of falling through. The result of this phenomenon was that large areas of the screen did not function as a filter. Another disadvantage of the above described Inclined Screen Saveall was that the angle of inclination of the screen was too great, resulting in a long travel of liquid along the screen before the region of complete separation was reached. The separated fibers then had little distance to travel whilst draining, and because of the steep angle, slid off anyway before draining could occur. The resulting flow of fibers off the screen was therefore too wet for many practical purposes.

In order to overcome such difficulties, it has been proposed to use a screen convexly curved in the direction of liquid flow thereon so that a combination of centrifugal, gravitational and kinetic forces causes the liquid adhered to the screen by surface tension forces to fall free. Such curved screens are more difficult to produce than flat screens and not so easily removed and replaced for cleaning or other purposes. It is also believed that curved screens do not perform as efficiently as screens according to the invention, partly due to the direction of liquid feed onto the screen being substantially parallel to the plane thereof, and also because the inclination of the screens is not readily adjustable to suit varying conditions such as liquid throughput and consistency of solid content.

It has been found that the use of flat adjustably inclined, fine mesh screens together with means for avoiding or abating the surface tension phenomenon affords efficient filtration, whereby the consistency of the wet fiber in the residue leaving the screen is about 4 – 6 percent by weight, which is very thick and handleable. The liquid which has passed through the screen may bear as little as 0.004 percent of free fiber, this being a very acceptable level. A contributory factor to the efficient filtration resides in providing that the stream of liquid falls or is projected onto the screen at an angle nearly normal to the plane thereof, so that its momentum carries the greater part of the stream immediately through the mesh thus tending to overcome the surface tension forces between the liquid and the mesh.

Aims of this invention is the provision of an improved inclined screen filter which is small enough to be installed in the immediate vicinity of paper making machinery so that it will continuously extract fibers from the effluent of the machinery for return to the machinery as reuseable stock.

According to this invention there is provided an inclined screen filter comprising a perforate and substantially flat screen supported by a frame, means to supply a flow of the fluid material to be filtered to the outwardly sloping face of the screen whence it falls for collection, characterised by the provision of means whereby flow of filtrate down the inner face of the screen due to surface tension is so reduced that liquid filtrate falls away from the inner face, i.e., the somewhat downwardly facing face.

The term "fluid material" is used to denote the solid-bearing liquid or fluid prior to filtration.

The invention further provides for the projection of the fluid material against the upper part of a screen with such velocity and at so nearly normal an angle to the plane of the screen that a substantial part of the liquid filtrate having passed through the screen leaves and falls away from the screen. This provision effectively reduces the boundary flow of filtrate down the screen which is otherwise held thereon by surface tension forces. Means according to the invention include baffle elements so fixed as to contact the inner face of the screen transversely to the direction of flow of filtrate so as to release its boundary flow from surface tension forces and cause it to fall away from the inner face.

It has been found in the case of filtering paper stock from its water where there may be other solids such as clay, that the use in conjunction of such baffles and projection of fluid material makes filtration possible with screens of fine mesh ranging in size from 60 meshes per inch (2.4 per mm.) to about 220 meshes per inc (8.7 per mm.). Although it is possible to employ still finer meshes, the throughput of filtrate then tends excessively to reduce as the pore size of the mesh reduces, until it becomes necessary to implement the gravitational forces by creating a pressure differential between the upper and inner faces of the screen. Screens of porous plastics material have been used in such a manner with a suction pump being employed to reduce the pressure below the screens.

"Blinding" or blocking of a screen, especially when clays or other filler materials are present in, for example, paper stock, does gradually occur over a period of time, but this period is extended considerably by using screens of a mesh which is of woven mono-filar material the surface of which material is polished and smooth. Furthermore, it may be beneficial to use an open or stretched weave wherein the amplitude of the filar undulations of warp and weft filaments is less than that of normally woven meshes for filtration purposes. Some of the meshes prepared and woven for "silk-screen" printing screens have these qualities; in particular the stainless steel and mono-filament nylon meshes, both of which also have the useful attribute of being corrosion-resistant.

It is believed that the surface tension forces are reduced by the use, in the context of the invention, of smooth and polished filaments in a mesh and that improved filtration results accordingly. In order to maintain the condition of the filament surfaces, the material of the mesh should in any case be corrosion-resistant in respect of the materials to be filtered.

Even though screens of smooth, polished mesh provide continuous filtration for many hours before cleaning becomes necessary, it has been found in some cases that a slow but progressive increase in boundary flow of filtrate down the screens occurs, which may be due to a coating or deposit on the mesh filament surfaces, of substances in the fluid material such as, for example, chemical salts or as in the case of some fluid materials in the food industry, starch, which increases the surface tension effects even though the deposits are not necessarily visible to the eye.

The use of a spray of purging liquid directed from time to time on to the upper face of the screens whereby the screens are periodically washed, say for 10 seconds once every hour as an example, to remove such deposits, has been found to afford continuous filtration over periods of days, as opposed to hours without such washing, before the screens need attention.

The purging liquid may conveniently be water, or even the actual filtrate itself re-circulated, or may be a liquid which reduces the surface tension forces between the filtrate and the screens providing of course that a small quantity thereof is not objectionable in the filtrate.

It has been found convenient to provide a hopper to confine and guide filtrate which falls from the screen to collection means, such as a suitable trough, thereby preventing splashing of filtrate. Such a hopper may be recessed in its upper margin to receive a screen which may be enframed for portability and further provided with means whereby the inclination of the hopper and the screen thereon may be varied. Varying the inclination of the screens has an effect on the filtration, there being, for each application, a particular inclination which affords best results. The screen should, it seems from tests, be more horizontal than vertical; for paper stock 30° off horizontal is typical.

An enframed screen may comprise a rectangular frame over which is stretched and attached, a screen of fine woven mesh of wire or filamentory plastics material. Walls may be provided at the lateral margins of the screen and extending outwardly from its plane to prevent lateral escape of material from the screen. Such walls may conveniently include handles whereby an enframed screen may be lifted and carried. The frame may include integral baffles or blades for contacting the inner face of the screen, these extending like rungs, from one lateral margin to the other.

It has been observed that better filtration occurs, i.e., less flow of filtrate down the screen and less tendency for the screens to "blind," when the velocity of the impinging fluid material is such that the screen is caused to vibrate.

The invention accordingly provides for means, energized by the fluid flow itself, whereby mechanical vibration is imparted to the screen and includes means, energized by the fluid flow itself, for imparting vibratory wave energy to the fluid material before it reaches the screen. Such means may include a somewhat elastic-reed like vibration generator, attached to the screen or the frame thereof, and which is caused to vibrate by the fluid material impinging thereon due to hydrodynamic instability.

The frequency of such vibrations may be ultrasonic in filters according to the invention and the direction of vibrations of the screen may be normal to the plane thereof. Means for vibrating the screen may, however, be provided which are energized independently of the fluid flow, such as, for example, an ultrasonic transducer or an unbalanced-motor type vibrator attached to the frame of the screen or the supporting hopper.

Examples of the invention will now be described with reference to the following drawings.

Figure 4:
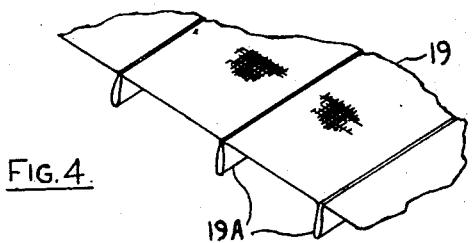
Figure 5:
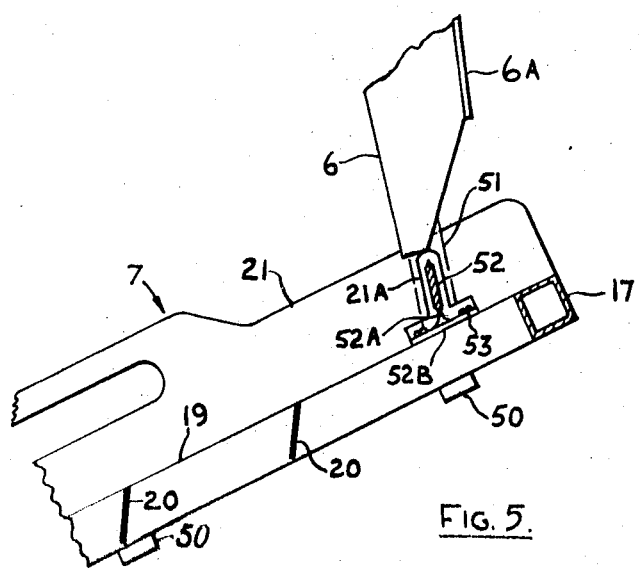

FIG. 4 similarly shows an alternative arrangement in part wherein the screen is folded to form integral baffles;

FIG. 5 shows similarly and in cross-section, a portion of an enframed screen to which a vibratory reed is attached.

Figure 1:
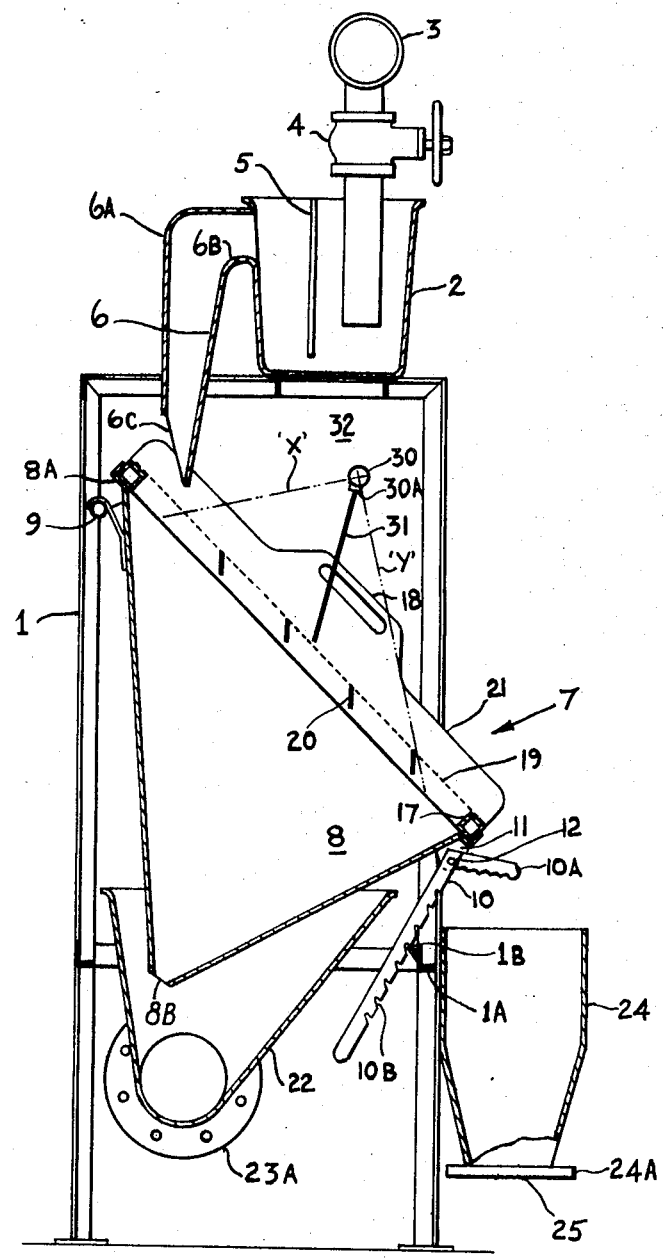
FIG. 1 shows a side elevation of an inclined screen filter in cross-section, which has a nominal throughput of 5,000 gallons per hour and is fitted with automatically operated spray purging means.
Figure 2:
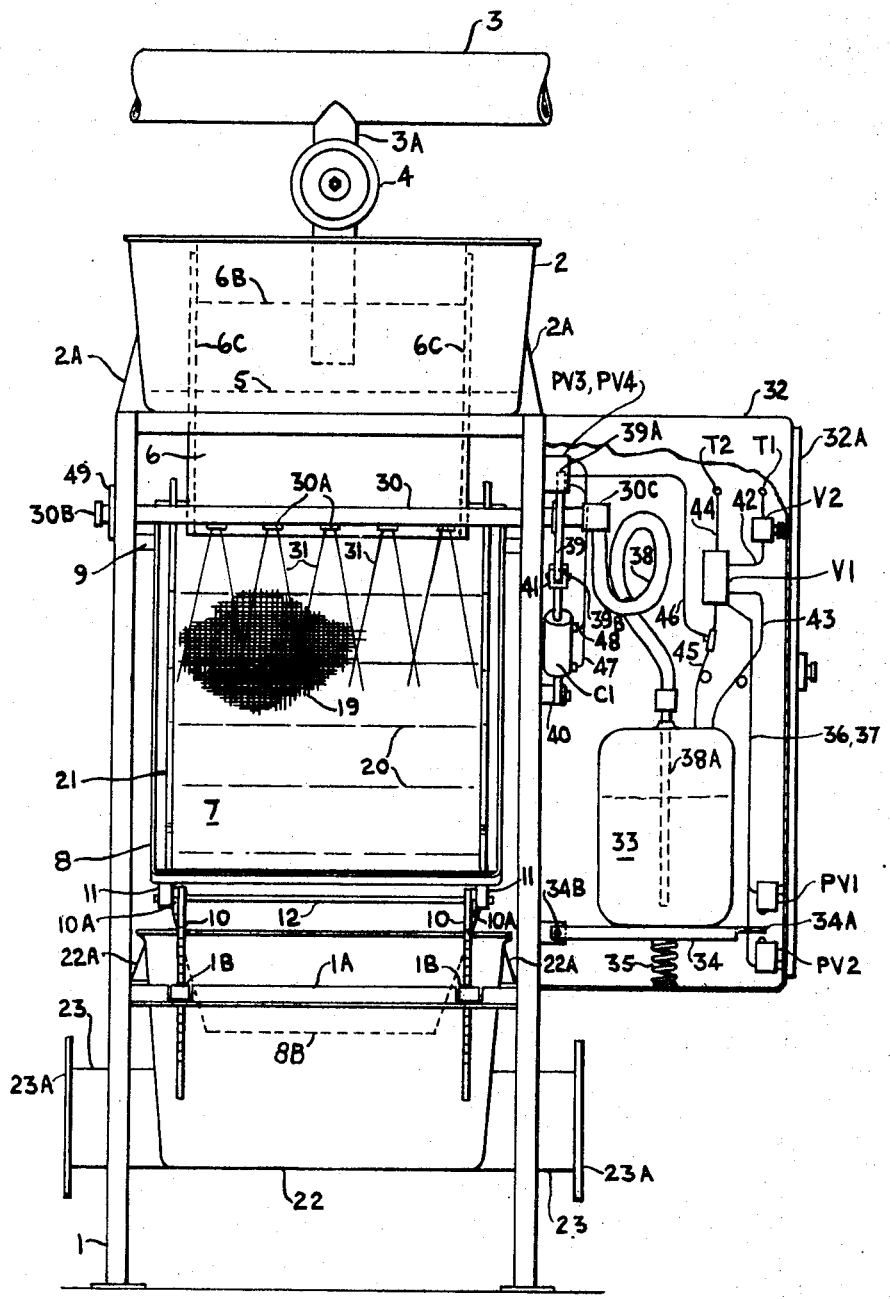
FIG. 2 is a front elevation of the filter of FIG. 1 and shows the spray means with the control cabinet cut-away.

Referring to FIGS. 1 and 2, the filter, which is a single screen filter of nominal throughput of 5,000 gallons per hour, comprises a supporting framework 1 which carries the main components. Affixed to the top of framework 1 is a header-tank 2 of GRP, i.e., glass fiber reinforced plastics material, into which fluid material flows from a pipe 3 or other suitable conduit or means for delivering the fluid to the tank. A hand-operated valve 4 is shown whereby the mass flow of fluid may be regulated.

A baffle 5 fitted transversely within the header-tank 2 reduces the turbulence of the liquid so that a substantially smooth flow of fluid leaves the tank 2 via weir 6B and delivery chute 6. The chute 6 is provided with walls 6C which serve to contain the fluid flowing therebetween, and a splash-cover 6A.

The fluid falls from chute 6 under the action of gravity on to a region near one end of a screen unit 7 which rests in a recess 8A provided in a hopper 8. This hopper is also formed of GRP and acts as a splash-guard and collector of fluid falling free from the underside of screen unit 7, which fluid is conveyed by the hopper 8 to a collection trough 22, passing thereinto through opening 8B provided at the bottom of the hopper.

The hopper 8 is pivotally mounted upon support tube 9, which is rigid with framework 1, so that it may be moved about tube 9 thereby to vary the inclination of screen unit 7 resting therein. A lifting mechanism is provided, whereby the hopper 8 may be so moved and locked into position, comprising two notched bars 10 to each of which a handle 10A is welded. The bars are rigidly fastened to a shaft 12 which is journalled at each end in bearing blocks 11 fastened to hopper 8. When locked in position, notches 10B of bars 10 engage with tabs 1B provided in cross-member 1A of framework 1, which tabs are angled backwards to suit the geometry of the notches. To lift or lower hopper 8, the handles 10A are grasped, slightly lifted and rotated clockwise (as viewed in FIG. 1) by wrist movement, until the notched bars 10 are clear of tabs 1B. The hopper 8 is then moved until the screen is inclined as required whereupon the handles 10A are rotated anticlockwise until the tabs 1B engage with the appropriate notches 10B.

Figure 3:
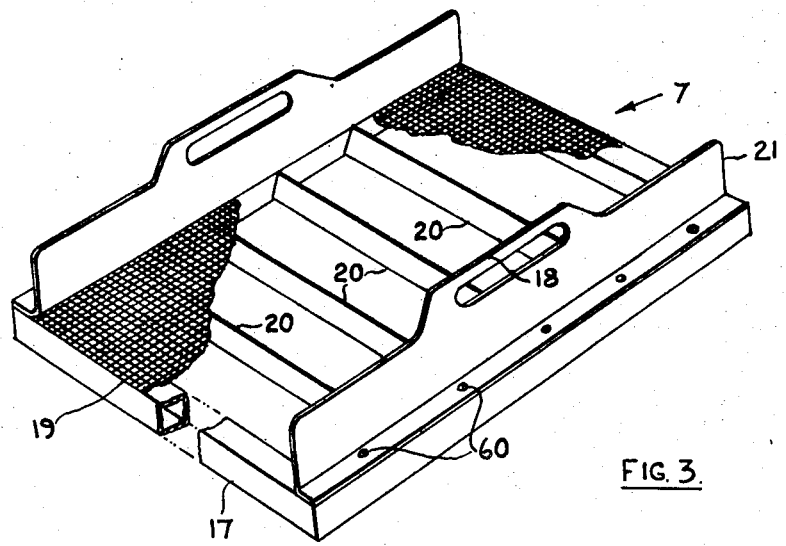
FIG. 3 is a perspective view illustrating an enframed screen, cut-away to show the transverse baffles.

The screen-unit 7 is shown in FIG. 3 and consists of a rectangular frame 17, 3 2 feet (91.5 61.0 cm.), fabricated from GRP extrusion of square section, across which is stretched and fastened thereto by epoxy resin adhesive, fine stainless steel or nylon mesh 19. A suitable mesh for most paper mill applications is that used for "silk-screen" printing purposes and having a mesh size of between 60 and 120 meshes per inch. Transverse blades 20 of stainless steel are located within slots formed in the inner sides of frame 17 so that the edges of the blades are in contact with the inner face of mesh 19. Side fences 21 of rigid plastics material are fastened to the side members of frame 17 by means of self-tapping screws 60. The fences 21 incorporate handles 18 whereby the whole screen-unit 7 may be lifted in and out of the filter for cleaning or for replacement purposes.

The fluid, i.e., the filtrate, which collects in trough 22 is ducted or pumped therefrom via one or both conduits 23, each provided with a flange 23A, integral with the trough. Two such flanged conduits are provided so that filters may be coupled in-line together to form a multi-filter installation. Normally, however, one of the flanges 23A is blanked-off. The filters are therefore modular in conception. A further trough 24 is situated outside framework 1 and fastened thereto below the lower end of the screen-unit 7 and from which the filtered solid material falls to be collected by the trough 24 whence it is removed via aperture 25 thereof. A flange 24A enables pipe-work or suitable ducting, for conveying the solid material elsewhere, to be attached to the trough 24. Trough 24 has been omitted from FIG. 2 for the sake of clarity.

Although a spray-unit is not required for every filtering application, such a unit is shown attached to the filter in FIGS. 1 and 2, and operates automatically to wash the mesh 19 of screen-unit 7 at pre-determined intervals without the use of electrical timers or any other electrical device. The spray-unit is generally contained within cabinet 32, enclosed by door 32A, with the exception of spray-bar 30 which extends through a wall of the cabinet 32 and over the screen-unit 7. The end of spray bar 30 distal from cabinet 32 extends through a bearing plate 49, rigid with framework 1, being rotatably supported thereby, and is closed by cap 30B, which cap is removable for maintenance purposes.

The spray bar 30 comprises a hollow tube or conduit into which is soldered fan-type spray nozzles 30A in fluid communication therewith. The end of the spray bar 30 within cabinet 32 is in fluid communication with a pressure vessel 33 via hose-connector 30C, flexible hose 38, and dip-tube 38A sealedly extending into vessel 33, so that when the vessel is filled with water or purging liquid and the free volume above the water pressurized with compressed air, the water or liquid is forced out through dip-tube 38 to create a numer of fan-shaped sprays 31 issuing from nozzles 30A. The sprays 31 impinge upon mesh 19 of screen-unit 7, the sprays overlapping one another to give the mesh a thorough wash when spray bar 30 is oscillated by means of pneumatic actuator C1. Chain-dotted lines "X" and "Y" in FIG. 1 define the limits of scan of the sprays 31.

A supply of low-pressure water is connected to terminal T1, and a supply of compressed air at approximately 60 p.s.i. is connected to terminal T2. A pneumatically operated four-way valve V1 having two positions, controlled by two pilot valves PV1 and PV2, conducts the water from T1 to vessel 33 when in the first position, the water passing through control valve V2, pipe 42, valve V1 and pipe 43. In the second position, the water supply to vessel 33 is cut off and compressed air admitted to the vessel 33 via pipes 44, valve V1 and pipe 45.

The amount of water in the vessel 33 is gauged by weighing the vessel which is fixed to a platform 34 hinged at 34B and supported by a spring 35. An extension 34A of the platform 34 extends between pilot valves PV1 and PV2, and when the vessel 33 is empty, the extension 34A engages to operate PV1 which then supplies compressed air to V1 causing it to adopt its first position. Water is thus fed to the vessel 33 which gradually fills at a rate governed by the setting of V2 until, when the required volume of water has been received by the vessel, the extension 34A engages to operate PV2 due to the gradual compression of spring 35 as the weight on platform 34 increases. PV2 causes V1 to adopt the second position, shutting off the water supply to the vessel 33 and admitting compressed air thereto.

Water, at the air pressure, is thus forced out of vessel 33 to issue from spray nozzle 30A. At the same time, compressed air is fed via pipe 46 to actuator C1 via pilot valves PV3 and PV4. The actuator C1, which is a double-acting pneumatic ram, is pivotally anchored at 40 to case 32 whilst the piston rod 41 is pivotally attached to end 39B of a crank 39 rigidly fixed to spray-bar 30 within cabinet 32. An extension 39A of crank 39 moves in an arc between PV3 and PV4, which define the limits of the arc, to contact one or the other, depending upon the direction of travel, thereby to repeatedly reverse the movement of piston rod 41. Thus spray bar 30 oscillates between limits imposed by PV3 and PV4. All four pilot valves PV1,2,3, and 4 may be positionally adjustable so that the amount of water to be delivered may be varied and the angle of scan of the spray varied.

When the water in vessel 33 falls below a certain level determined by the position of PV1, valve V1 reverts to its first position and cuts off the air to vessel 33 which it also vents to atmosphere. The water is again fed to vessel 33 and the cycle repeats. The cycle time is governed by the setting of V2.

This particular system is of value where high pressure water supplies are not available, or where the supplies are not of constant pressure as is often the case in paper mills where the water demand varies considerably.

It is possible to supply high pressure water direct to the spray bar 30 and to use the same supply to actuate the oscillating mechanism. A hydraulic timer could be then used to periodically supply the water to the timer. Such systems are deemed to fall within the scope of the invention.

It has been found that a satisfactory inclination of the screen-unit 7 is between 30 and 40 from the horizontal.

Referring to FIG. 4, there is shown an alternative method to that of the blades 20 of FIG. 3, in which the mesh 19 is folded at intervals to form downward-hanging loops 19A and stitched or suitably seamed along the folds to make the loops 19A permanent. Mesh so modified is then affixed to frame 17 as before, but taking care to cut away those portions of loops 19A which would otherwise come into contact with the frame 17.

A method of using the kinetic energy of the fluid material leaving chute 6 to vibrate a screen-unit 7 is shown in FIG. 5, in which a reed 52 extends parallel to and transversely across above mesh 19 and spaced therefrom, the plane of the reed 52 being generally in the plane of the fluid stream 51, leaving chute 6. Each end of reed 52 extends through a cut-out 21A in each side fence 21, and is fastened at each end to the side members of frame 17 by a mounting, comprising an elastic beam 52A integral with a foot or flange 53B, and screws 53.

The flow of fluid 51 over reed 52 causes it to vibrate and resonate at a frequency determined by the mass of the reed 52 and the dimensions and elasticity of the beams 52A. The amplitude of vibration is governed by the velocity of the fluid stream 51. The vibrations of the reed 52 are transmitted to frame 17 and the mesh 19 thereon, via the feet 52B; the frame 17 being free to vibrate within the recess 8A of hopper 8 by reason of resilient feet 50 attached to the underside of frame 17 and upon which frame 17 is supported in the hopper recess 8A.

Another form of vibrator may conveniently comprise an out-of-balance rotor borne between side-fences 21 and caused to rotate by the fluid stream 51 impinging upon turbine blades integral with the rotor, thus creating horizontal and vertical components of vibration.

Although only a single screen filter module has been herein described, multi-screen modules have been provided in which two or more hoppers 8 and associated screen-units 7 are mounted side-by-side within an extended framework 1 and in co-operation with an extended header tank 2 having a multiplicity of chutes 6. In such filters, the spray bar 30 extends over all the screen-units and is operated from the one control case 32.

The invention embraces filters in cascade arrangement wherein the filtrate leaving a hopper 8 via aperture 8B therein impinges directly on to another screen-unit situated directly below hopper 8, itself supported by a further hopper. Thus the uppermost screen-unit may remove coarse material from the fluid material whilst the lower screen-unit may remove fine solids from the filtrate of the uppermost screen-unit.

The scope of the invention is also deemed to embrace inclined screen filters as described herein in which the spray-unit washes the underside of the screen, and in which the spray-unit washes the screen with a purging liquid which is, or contains, a substance which reduces the surface tension forces acting between the fluid material, the filtrate and the screen. Alternatively the screens may be coated with a substance which reduces the surface tension forces such as polytetrafluoroethylene (P.T.F.E.).

Although the use of the filter in the paper industry has herein been used by way of example, filters according to the invention may be used to filter, or concentrate effluent which is a byproduct of the food, brewing, leather-tanning and many other industries.

I claim:

1. An inclined screen filter comprising a header tank for discharging fluid material on to the outer sloping face of the screen which is supported by a hopper mounted for movement about an axis, said hopper being mounted beneath the inner face of the screen for receiving and collecting the filtrate fall-free from said face, the filtrate being guided by the hopper for deposit into a collection trough, the screen comprising a flat screen stretched across and attached to a rigid frame, thin blade members being provided and fixed to said frame so as to contact the inner face of the screen along their respective side edges transversely to the direction of flow of filtrate down the inner face held thereon by surface tension forces, said blade members lying in a substantially vertical plane and serving to release the boundary flow from such forces and cause it to fall away from the inner face, the screen and frame being adapted so as to be readily removed and replaced, and being at an angle of about 30° to 40° from the horizontal.

2. An inclined screen filter, comprising a perforate and substantially flat, downwardly sloping screen, a frame supporting said screen, means for supplying a flow in a substantially vertical direction of fluid material to be filtered directly on to the outer surface of the sloping screen, at least one thin blade member provided on said frame in contact along one of its side edges with the inner surface of said screen and lying transversely to the direction of flow of filtrate from the fluid material, said blade member lying in a substantially vertical plane and serving to interrupt the boundary flow of the liquid filtrate and cause it to fall away from said inner surface, said frame supporting said screen at an angle of about 30° to 40° from the horizontal.

3. Filter according to claim 2 of which the screen is of a woven mesh of 60 – 220 per inch (2.4 – 8.7 per m.m.).

4. Filter according to claim 2 of which the screen is made of a woven wire of smooth, polished, corrosion-resistant metal.

5. Filter according to claim 2 of which the screen is of a woven plastics monofilar material of smooth surface.

6. Filter according to claim 2 in which means are provided for vibrating the screen.

7. Filter according to claim 2 in which means are provided on the outer surface of the screen to be energized by the fluid flow itself for imparting vibratory wave energy to the fluid material before it reaches the screen.

8. Filter according to claim 1 in which means are provided for adjusting the inclination of the screen.

9. Filter according to claim 1 further provided with means for intermittently spraying a purging liquid against the outwardly sloping face of the screen.

10. Filter according to claim 1 in which at the lateral margins of the screen and extending outwardly from its plane are provided walls to prevent lateral escape of material from the screen.

11. Filter according to claim 10 in which there is provided below the inner face of the screen a hopper to confine and guide filtrate which falls from the screen.

12. Filter according to claim 11 in which the hopper is provided with a recess to receive the frame of the screen.

13. Filter according to claim 12 in which means are provided for varying the inclination of the screen about a horizontal axis.

14. Filter according to claim 13 in which the screen and frame comprise a screen-unit adapted to be readily removable and replaceable.

15. The filter according to claim 2 wherein a plurality of said blade members are provided on said frame at a first predetermined spacing from one another, the unsupported length of said screen directly beneath said supply means being greater than said spacing to thereby permit said unsupported length to vibrate as a result of the direct supply of fluid material on to said outer surface.

16. An inclined screen filter comprising in combination:
a frame supported, flat, planar screen of fine mesh, corrosive resistant material mounted at an angle of about 30° to 40° from the horizontal;
a plurality of thin blades spaced along the underside of said screen, each extending transversely thereacross, each having an upper edge in contact with said underside to divert liquid away therefrom and each having a free terminal lower drip edge;
said screen having an upper impact area, spaced above the uppermost said blade; and
fluid material supply means mounted at a spaced distance above said impact area for flowing said fluid material in a direction substantially normal to the plane of said screen onto the central portion of said impact area,
whereby some of the liquid in said fluid material passes through, and away from the underside of said screen upon impact, some of said liquid flows down said underside to said blades and falls off the lower drip edges thereof and the wet fibers in said fluid material advance down the upper side of said inclined screen to the bottom portion thereof.

17. A filter according to claim 16 further comprising means for intermittently spraying a purging liquid against the outwardly sloping face of said screen.

18. A filter according to claim 17 wherein the purging liquid acts to reduce the surface tension forces between the fluid material and the screen.

19. A filter according to claim 17 in which the purging liquid is filtrate.

* * * * *